(12) United States Patent
Okochi et al.

(10) Patent No.: US 7,371,460 B2
(45) Date of Patent: May 13, 2008

(54) HIGHLY ADHESIVE PRESSURE SENSITIVE ADHESIVE COMPOSITIONS AND SHEETS

(75) Inventors: Naoki Okochi, Ibaraki (JP); Masahiko Ando, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 56 days.

(21) Appl. No.: 10/157,138

(22) Filed: May 30, 2002

(65) Prior Publication Data

US 2003/0017331 A1     Jan. 23, 2003

(30) Foreign Application Priority Data

May 30, 2001    (JP) .............................. 2001-162053

(51) Int. Cl.
*B32B 27/40*    (2006.01)

(52) U.S. Cl. .................... 428/423.1; 526/931; 526/320

(58) Field of Classification Search .................. 528/44, 528/52, 53, 59, 68, 75, 76, 80, 81, 82, 905, 528/54; 525/330.3; 526/931, 320; 412/901; 427/208.4; 428/423.1; 524/44, 54
See application file for complete search history.

(56) References Cited

U.S. PATENT DOCUMENTS

| | | | | |
|---|---|---|---|---|
| 3,865,770 A | * | 2/1975 | Blake | 524/187 |
| 5,433,892 A | * | 7/1995 | Czech | 252/500 |
| 5,734,002 A | * | 3/1998 | Reich et al. | 528/53 |
| 5,977,284 A | * | 11/1999 | Reich et al. | 528/53 |
| 6,177,540 B1 | * | 1/2001 | Harlan et al. | 528/364 |
| 6,180,742 B1 | * | 1/2001 | Kato et al. | 526/328.5 |
| 6,489,396 B2 | * | 12/2002 | Nakamura et al. | 525/117 |
| 6,552,118 B2 | * | 4/2003 | Fujita et al. | 524/588 |

FOREIGN PATENT DOCUMENTS

| | | |
|---|---|---|
| JP | 03/054285 | 7/1989 |
| JP | 5-163480 | 6/1993 |
| JP | 5-169596 | 7/1993 |
| JP | 8-41433 | 2/1996 |
| JP | 8-120247 | 5/1996 |
| JP | 8-199143 | 8/1996 |
| JP | 10/330722 | 12/1998 |
| JP | 2000-230157 A | 8/2000 |

OTHER PUBLICATIONS

Copending U.S. Appl. No. 10/157,136.*

* cited by examiner

*Primary Examiner*—Thao Tran
(74) *Attorney, Agent, or Firm*—Birch, Stewart, Kolasch & Birch, LLP

(57) ABSTRACT

A highly adhesive pressure sensitive adhesive composition includes at least (A) a hydroxyl-group-containing acrylic polymer, (B) an amine compound containing plural hydroxyl groups, and (C) a polyisocyanate compound and has a gel fraction of equal to or more than 10% by weight and less than 70% by weight after drying or curing. A highly adhesive pressure sensitive adhesive sheet has a highly adhesive pressure sensitive adhesive layer including the highly adhesive pressure sensitive adhesive composition formed on one or both sides of a base material. The sheet preferably has a 180° peel force with respect to a stainless steel sheet of 10 N/20-mm or more as determined at a pulling rate of 300 mm/minute, 23° C. and 50% relative humidity.

7 Claims, No Drawings

HIGHLY ADHESIVE PRESSURE SENSITIVE ADHESIVE COMPOSITIONS AND SHEETS

BACKGROUND OF THE INVENTION

1. Field of the Invention

The present invention relates to a highly adhesive pressure sensitive adhesive composition which mainly contains an acrylic polymer and is used in labels, pressure sensitive adhesive tapes or sheets, as well as to such a highly adhesive pressure sensitive adhesive sheet using the highly adhesive pressure sensitive adhesive composition.

2. Description of the Related Art

Conventional pressure sensitive adhesive compositions, pressure sensitive adhesive tapes and sheets can adhere to adherends at atmospheric temperatures at a certain pressure of finger-pressure and are widely used for bonding, packaging, surface protecting or for electrical uses. Specifically in bonding applications, demands have been often made on highly adhesive pressure sensitive materials in order to ensure high reliability and safety.

When members bonded using, for example, such pressure sensitive adhesive tapes become unnecessary, the members themselves including the pressure sensitive adhesive tapes as intact are discarded or are disposed by incineration. However, demands to recycle recyclable materials such as aluminium, poly(ethylene terephthalate), polystyrenes and other plastics have increased from the viewpoint of ecology. Upon recycling, different materials constituting the members must definitely be separated and the pressure sensitive adhesive tapes must be peeled off from the members.

However, conventional pressure sensitive adhesive tapes, especially highly adhesive pressure sensitive adhesive tapes, often increase in their adhesive strength due to changes with time after adhesion to adherends, and cannot significantly be peeled off from the adherends after adhesion or leave the pressure sensitive adhesives as deposits.

As is described above, conventional pressure sensitive adhesives, especially highly adhesive pressure sensitive adhesives for use in recycle members, become more highly adhesive with their increasing tackiness (adhesive strength) with time and thereby cannot significantly be peeled off from the adherends or stain the adherends. For example, the pressure sensitive adhesives cause adhesive deposits on the adherends. Demands have therefore been made to solve these problems.

SUMMARY OF THE INVENTION

Accordingly, an object of the present invention is to provide a highly adhesive pressure sensitive adhesive composition and a highly adhesive pressure sensitive adhesive sheet which exhibit such high tackiness as to strongly adhere to an adherend upon adhesion, are suppressed or prevented from increasing in tackiness with time and can be peeled off from the adherend after adhesion without staining the adherend.

Another object of the present invention is to provide a highly adhesive pressure sensitive adhesive composition and a highly adhesive pressure sensitive adhesive sheet which can exhibit sufficient cohesion after short-time aging and have satisfactory productivity.

After intensive investigations to achieve the above objects, the present inventors have found that a pressure sensitive adhesive which includes an acrylic polymer containing a hydroxyl group in combination with a specific curing agent and a specific curing aid and exhibits a specific gel fraction after drying or curing is useful. Specifically, this pressure sensitive adhesive exhibits such high tackiness as to firmly adhere to an adherend upon adhesion, is suppressed or prevented from increasing in tackiness with time and can be peeled off from the adherend after adhesion without staining the adherend. The present invention has been accomplished based on these findings.

Specifically, the present invention provides, in one aspect, a highly adhesive pressure sensitive adhesive composition at least including (A) a hydroxyl-group-containing acrylic polymer, (B) an amine compound containing plural hydroxyl groups, and (C) a polyisocyanate compound, in which a dried or cured product of the composition has a gel fraction of equal to or more than 10% by weight and less than 70% by weight.

The highly adhesive pressure sensitive adhesive composition of the present invention preferably satisfies the following conditions:

(i) $M_B/M_A$ ranges from 0.05 to 500; and (ii) $M_C/[M_A+M_B]$ ranges from 0.05 to 500, wherein $M_A$, $M_B$ and $M_C$ are by mole; $M_A$ is the content of hydroxyl groups derived from the hydroxyl-group-containing acrylic polymer (A); $M_B$ is the content of hydroxyl groups derived from the amine compound (B) containing plural hydroxyl groups; and $M_C$ is the content of isocyanate groups derived from the polyisocyanate compound (C).

In another aspect, the present invention provides a highly adhesive pressure sensitive adhesive sheet including a base material and a highly adhesive pressure sensitive adhesive layer which is formed at least on one side of the base material and includes the highly adhesive pressure sensitive adhesive composition. The highly adhesive pressure sensitive adhesive sheet preferably has a 180° peel force of equal to or more than 10 N/20-mm with respect to a stainless steel sheet as determined at a rate of pulling of 300 mm/minute, at 23° C. and at 50% relative humidity.

The highly adhesive pressure sensitive adhesive sheet of the present invention having the aforementioned configuration exhibits such high tackiness as to firmly adhere to an adherend upon adhesion, is suppressed or prevented from increasing in tackiness with time and can be peeled off from the adherend after adhesion without staining the adherend. The pressure sensitive adhesive sheet is therefore excellent in workability in removing procedure.

For example, when the highly adhesive pressure sensitive adhesive sheet of the present invention is attached to a recyclable adherend, it firmly adheres to the adherend during adhesion but can be peeled off from the adhered without leaving the pressure sensitive adhesive when the adherend is recycled and the sheet is peeled off.

DESCRIPTION OF THE PREFERRED EMBODIMENTS

The highly adhesive pressure sensitive adhesive composition of the present invention uses a hydroxyl-group-containing acrylic polymer (A) (hereinafter referred to as "acrylic polymer (A)"), an amine compound (B) having plural hydroxyl groups (hereinafter referred to as "amine compound (B)"), and a polyisocyanate compound (C) (hereinafter referred to as "isocyanate compound (C)"). The acrylic polymer (A) can be used as a base polymer (a base component of the pressure sensitive adhesive), the amine compound (B) can be used as a curing aid (a crosslinking aid), and the isocyanate compound (C) can be used as a curing agent (a crosslinking agent). Specifically, the base polymer, acrylic polymer (A), can be crosslinked and cured, for example, by means of heat during drying by the use of the isocyanate compound (C) as the curing agent and the amine compound (B) as the curing aid. It is important that the highly adhesive pressure sensitive adhesive composition of the present invention exhibits a gel fraction of equal to or more than 10% by weight and less than 70% by weight after drying or after curing. Specifically, in the highly adhesive pressure sensitive adhesive composition of the present invention, the acrylic polymer (A) is to be crosslinked with the use of the isocyanate compound (C) and the amine compound (B) in such a manner that the resulting product exhibits a gel fraction of equal to or more than 10% by weight and less than 70% by weight. Accordingly, when a pressure sensitive adhesive sheet carrying a pressure sensitive adhesive layer comprising the highly adhesive pressure sensitive adhesive composition is attached to an adherend upon transportation, storage or processing of the adherend, it can effectively and firmly adhere to the adherend. In addition, the pressure sensitive adhesive sheet can hold the adhesive strength for a long time and is suppressed or prevented from increasing in adhesive strength with time. Accordingly, it can satisfactorily be peeled off from the adherend, when required, without causing adhesive deposits on the adherend and without staining the adherend. The highly adhesive pressure sensitive adhesive composition of the present invention can yield a highly adhesive pressure sensitive adhesive sheet that can exhibit sufficient tackiness when it adheres to an adherend with no or nearly no change in the tackiness with time and can be peeled off from the adherend without causing adhesive deposits on the adherend.

The gel fraction of a dried or cured product of the highly adhesive pressure sensitive adhesive composition is preferably equal to or more than 10% by weight and less than or equal to 60% by weight (from 10% to 60% by weight), and more preferably from 15% to 50% by weight. If the gel fraction is equal to or more than 70% by weight, the adhesive strength is decreased and the composition does not exhibit high adhesiveness.

The gel fraction as used herein is determined according to the following procedure. A sample pressure sensitive adhesive (a cured polymer) having a dry weight of $W_1$ (g) is immersed in ethyl acetate at room temperature (e.g., at 20° C.) for three days, is taken out from ethyl acetate, and is dried. The weight $W_2$ (g) of the dried pressure sensitive adhesive is determined, and the gel fraction of the pressure sensitive adhesive is then calculated according to the following equation:

Gel fraction (% by weight)=$(W_2/W_1) \times 100$

More specifically, the gel fraction can be determined in the following manner. A solution of the sample pressure sensitive adhesive composition is applied onto a film that has been subjected to release treatment, is dried at 110° C. for 3 minutes, and a fixed amount $W_1$ (g) (about 500 mg) of the resulting pressure sensitive adhesive is sampled. The sampled pressure sensitive adhesive is allowed to stand in ethyl acetate at room temperature for three days to thereby elute sol contents, the residual gel is taken out and is dried at 100° C. for 2 hours, and the weight $W_2$ (g) of the gel content is determined. The substitution of the measured values of $W_1$ and $W_2$ into the above equation yields the gel fraction.

The gel fraction of the pressure sensitive adhesive can be controlled, for example, by appropriately selecting the types and ratios of monomers constituting the base polymer of the pressure sensitive adhesive, the type and amount of a polymerization initiator, the reaction temperature, the types and amounts of the crosslinking agent and crosslinking aid, and other polymerization conditions.

The proportion among the acrylic polymer (A), the amine compound (B) and the isocyanate compound (C) in the composition of the present invention may be such proportion as to satisfy the following conditions:

(i) $M_B/M_A$ ranges from 0.05 to 500, preferably from 0.07 to 300, and more preferably from 0.1 to 50; and (ii) $M_C/[M_A+M_B]$ ranges from 0.05 to 500, preferably from 0.1 to 100, and more preferably from 0.2 to 50, wherein $M_A$, $M_B$ and $M_C$ are by mole; $M_A$ is the content of hydroxyl groups derived from the acrylic polymer (A); $M_B$ is the content of hydroxyl groups derived from the amine compound (B); and $M_C$ is the content of isocyanate groups derived from the isocyanate compound (C).

When the proportion among the three components satisfies the above conditions, the acrylic polymer (A) can more effectively be cured, and the pressure sensitive adhesive composition can exhibit more satisfactory cohesion.

Hydroxyl-Group-Containing Acrylic Polymers (A)

The acrylic polymers (A) for use in the present invention are not specifically limited as long as they are acrylic polymers each containing at least one hydroxyl group in its molecule. As the acrylic polymers (A), copolymers comprising at least alkyl esters of (meth)acrylic acid and hydroxyl-group-containing copolymerizable monomers as monomer components can be used. Each of these acrylic polymers (A) can be used alone or in combination.

Such alkyl esters of (meth)acrylic acid are not specifically limited and are preferably alkyl esters of (meth)acrylic acid each containing from 1 to 18 and preferably from 2 to 12 carbon atoms in the alkyl moiety. The alkyl esters of (meth)acrylic acid include, but are not limited to, methyl (meth)acrylate, ethyl (meth)acrylate, propyl (meth)acrylate, isopropyl (meth)acrylate, butyl (meth)acrylate, isobutyl (meth)acrylate, hexyl (meth)acrylate, 2-ethylhexyl (meth)acrylate, octyl (meth)acrylate, nonyl (meth)acrylate, isononyl (meth)acrylate, decyl (meth)acrylate, dodecyl (meth)acrylate, and other alkyl esters of (meth)acrylic acid. Each of these alkyl esters of (meth)acrylic acid can be used alone or in combination.

The hydroxyl-group-containing copolymerizable monomers are not specifically limited and include, for example, hydroxymethyl (meth)acrylate, 2-hydroxyethyl (meth)acrylate, 2-hydroxypropyl (meth)acrylate, 3-hydroxypropyl (meth)acrylate, 4-hydroxybutyl (meth)acrylate, 6-hydroxyhexyl (meth)acrylate, and other hydroxyalkyl esters of (meth)acrylic acid, as well as vinyl alcohol; allyl alcohol; 2-hydroxyethyl vinyl ether, 3-hydroxypropyl vinyl ether, 4-hydroxybutyl vinyl ether, and other hydroxyl alkyl vinyl ethers; 2-hydroxyethyl allyl ether, and other hydroxyalkyl allyl ethers; 2-hydroxyethyl crotonate, and other hydroxyalkyl esters of crotonic acid; and methylolated (meth)acrylamide. Each of these hydroxyl-group-containing copolymerizable monomers can be used alone or in combination.

The acrylic polymer (A) may further comprise monomers known as modifying monomers for acrylic pressure sensitive adhesives as monomer components. Such modifying monomers include, but are not limited to, vinyl acetate, vinyl propionate, vinyl butyrate, and other vinyl esters; (meth)acrylonitrile; (meth)acrylamide and other amido-group-containing copolymerizable monomers; glycidyl (meth)acrylate and other epoxy-group-containing copolymerizable monomers; alkyl esters of N,N-dimethylaminoethyl(meth)acrylic acid and other amino-group-containing copolymerizable monomers; (meth)acrylic acid, crotonic acid, itaconic acid, maleic acid, fumaric acid, and other carboxyl-group-containing copolymerizable monomers. Each of these modifying monomers can be used alone or in combination. Among them, carboxyl-group-containing copolymerizable monomers can advantageously be used as the modifying monomers, of which acrylic acid is typically preferred.

The acrylic polymer (A) may further comprise, as monomer components, additional copolymerizable monomers in addition to the aforementioned monomers. Such additional copolymerizable monomers include, but are not limited to, ethylene, propylene, and other olefins and dienes; methoxymethyl (meth)acrylate, 2-methoxyethyl (meth)acrylate, and other alkoxyalkyl esters of (meth)acrylic acid; vinyl chloride, vinylidene chloride, and other halogen-atom-containing vinyl monomers; methyl vinyl ether, ethyl vinyl ether, and other vinyl ethers; styrene, vinyltoluene, and other styrenic monomers.

The acrylic polymer (A) can be prepared according to conventional polymerization processes such as solution polymerization process using a polymerization initiator such as an azo compound or a peroxide; emulsion polymerization process; bulk polymerization process; and polymerization process using a photosensitive initiator and irradiating materials with light or radiant ray. According to the present invention, a radical polymerization process is advantageously employed. In this process, a polymerization initiator that generates a radical upon decomposition is used for the polymerization. In the radical polymerization process, polymerization initiators for use in conventional radical polymerization can be used. Such polymerization initiators include, for example, dibenzoyl peroxide, tert-butyl permaleate, and other peroxides; 2,2'-azobisisobutyronitrile, azobisisovaleronitrile, and other azo compounds.

In the radical polymerization, the amount of the polymerization initiator may be such an amount that is generally used in polymerization of acrylic monomers and is, for example, from about 0.005 to about 10 parts by weight, and preferably from about 0.1 to 5 parts by weight, relative to 100 parts by weight of the total amount of the monomer components such as the alkyl ester of (meth)acrylic acid and the hydroxyl-group-containing copolymerizable monomer.

When the acrylic polymer (A) for use in the present invention is prepared by the polymerization of the monomer components such as the alkyl ester of (meth)acrylic acid, the hydroxyl-group-containing copolymerizable monomer, and modifying monomers, it generally comprises the alkyl ester of (meth)acrylic acid as a major component. The content of the alkyl ester of (meth)acrylic acid in the acrylic polymer (A) is, for example, equal to or more than about 50% by mole (e.g., from about 50% to about 99.9% by mole), preferably equal to or more than about 80% by mole (e.g., from about 80% to about 99.8% by mole), and more preferably equal to or more than about 90% by mole (e.g., from about 90% to about 99.5% by mole), based on the total amount of the monomer components.

The content of the hydroxyl-group-containing copolymerizable monomer in the acrylic polymer (A) is, for example, less than about 20% by weight (e.g., equal to or more than about 0.01% by mole and less than about 20% by mole), preferably less than about 10% by mole (e.g., equal to or more than about 0.02% by mole and less than about 10% by mole), and more preferably less than about 5% by mole (e.g., equal to or more than about 0.05% by mole and less than about 5% by mole), based on the total amount of the monomer components.

The molecular weight (e.g., a weight average molecular weight) of the acrylic polymer (A) is not specifically limited. For example, the weight average molecular weight of the acrylic polymer (A) is equal to or more than about $5 \times 10^4$ (e.g., from about $5 \times 10^4$ to about $300 \times 10^4$), preferably from about $10 \times 10^4$ to about $250 \times 10^4$, and more preferably from about $20 \times 10^4$ to about $200 \times 10^4$.

The composition of the present invention may further comprise an acrylic polymer having a reactive functional group other than hydroxyl group, in addition to the acrylic polymer (A) as the base polymer.

Amine Compounds (B) Containing Plural Hydroxyl Groups

The amine compounds (B) for use in the present invention are not specifically limited as long as they are amine compounds each having at least two hydroxyl groups (alcoholic hydroxyl groups) in its molecule. The number of nitrogen atoms per molecule of such amine compounds (B) is not specifically limited. Each of these amine compounds (B) can be used alone or in combination.

Of these amine compounds (B), examples of amine compounds (B) each having one nitrogen atom in its molecule are diethanolamine, dipropanolamine, diisopropanolamine, N-methyldiethanolamine, N-methyldiisopropanolamine, N-ethyldiethanolamine, N-ethyldiisopropanolamine, N-butyldiethanolamine, N-butyldiisopropanolamine, and other dialcohol-amines; triethanolamine, tripropanolamine, triisopropanolamine, and other trialcohol-amines.

Amine compounds (B) each having two nitrogen atoms in its molecule include amine compounds represented by following Formula (1)

wherein $R^1$, $R^2$, $R^3$ and $R^4$ are the same or different and are each a hydrogen atom or a group: $-(R^5O)_m(R^6O)_n-H$, where $R^5$ and $R^6$ are different and are each an alkylene group; and m and n are each an integer of equal to or more than 0 and are not concurrently 0; where at least two of $R^1$, $R^2$, $R^3$ and $R^4$ are the group: $-(R^5O)_m(R^6O)_n-H$; x is a divalent hydrocarbon group; and p is an integer of equal to or more than 1.

Alkylene groups in $R^5$ and $R^6$ in Formula (1) include, but are not limited to, methylene, ethylene, propylene, trimethylene, tetramethylene, ethylethylene, pentamethylene, hexamethylene, and other alkylene groups each containing from about 1 to about 6 carbon atoms. Among them, alkylene groups each containing from 1 to 4 carbon atoms are preferred, of which alkylene groups each containing 2 or 3 carbon atoms are typically preferred. These alkylene groups may be straight-chain or branched-chain alkylene groups. As the alkylene groups in $R^5$ and $R^6$, ethylene group and propylene group are preferred.

The repetition numbers m and n are not specifically limited as long as they are integers equal to or more than 0. For example, at least one of m and n may range from about 0 to about 20, and preferably from about 1 to about 10. In many cases, one of m and n is 0 and the other is an integer of equal to or more than 1 (specifically 1). The repetition numbers m and n are not concurrently 0. If m and n are concurrently 0, the substituents $R^1$, $R^2$, $R^3$ and $R^4$ represent hydrogen atoms.

The group x is a divalent hydrocarbon group. Such divalent hydrocarbon groups include, for example, alkylene groups, cycloalkylene groups and arylene groups. The alkylene groups as x may be saturated or unsaturated straight- or branched-chain alkylene groups. Such alkylene groups as x include, but are not limited to, methylene, ethylene, propylene, trimethylene, tetramethylene, and other alkylene groups each containing from about 1 to about 6 carbon atoms. Among them, alkylene groups each containing from 1 to 4 carbon atoms are preferred, of which alkylene groups each containing 2 or 3 carbon atoms are typically preferred. The cycloalkylene groups include, but are not limited to, 1,2-cyclohexylene group, 1,3-cyclohexylene group, 1,4-cyclohexylene group, and other cycloalkylene groups each containing from about 5 to about 12 members in its ring. The arylene groups include, but are not limited to, 1,2-phenylene group, 1,3-phenylene group and 1,4-phenylene group.

The repetition number p is not specifically limited as long as it is an integer of equal to or more than 1. The repetition number p is, for example, an integer from 1 to about 10, preferably an integer from 1 to 6, and more preferably an integer from 1 to 4.

More specifically, examples of the amine compounds (B) represented by Formula (1) are N,N,N',N'-tetrakis(2-hydroxyethyl)ethylenediamine, N,N,N',N'-tetrakis(2-hydroxypropyl)ethylenediamine, N,N,N',N'-tetrakis(2-hydroxyethyl)trimethylenediamine, N,N,N',N'-tetrakis(2-hydroxypropyl)trimethylenediamine, as well as polyoxyethylene condensates of ethylenediamine, polyoxypropylene condensates of ethylenediamine, polyoxyethylene-polyoxypropylene condensates of ethylenediamine, and other polyoxyalkylene condensates of alkylenediamines. Such amine compounds (B) are commercially available, for example, from Asahi Denka Kogyo K.K. under the trade names of EDP-300, EDP-450, EDP-1100 and Pluronic.

The composition of the present invention may further comprise additional amine compounds each having plural reactive functional groups other than hydroxyl groups, in addition to the amine compounds (B).

Polyisocyanate Compounds (C)

The isocyanate compounds (C) for use in the present invention are not specifically limited as long as they each contain at least two isocyanate groups in its molecule. Such isocyanate compounds (C) include, for example, aliphatic polyisocyanates, alicyclic polyisocyanates, aromatic polyisocyanates and aromatic-aliphatic polyisocyanates. Each of these isocyanate compounds (C) can be used alone or in combination.

The aliphatic polyisocyanates include, but are not limited to, 1,6-hexamethylene diisocyanate, 1,4-tetramethylene diisocyanate, 2-methyl-1,5-pentane diisocyanate, 3-methyl-1,5-pentane diisocyanate, lysine diisocyanate, and other aliphatic diisocyanates.

The alicyclic polyisocyanates include, but are not limited to, isophorone diisocyanate, cyclohexyl diisocyanate, hydrogenated tolylene diisocyanate, hydrogenated xylene diisocyanate, hydrogenated diphenylmethane diisocyanate, hydrogenated tetramethylxylene diisocyanate, and other alicyclic diisocyanates.

The aromatic polyisocyanates include, but are not limited to, 2,4-tolylene diisocyanate, 2,6-tolylene diisocyanate, 4,4'-diphenylmethane diisocyanate, 2,4'-diphenylmethane diisocyanate, 4,4'-diphenyl ether diisocyanate, 2-nitrodiphenyl-4,4'-diisocyanate, 2,2'-diphenylpropane-4,4'-diisocyanate, 3,3'-dimethyldiphenylmethane-4,4'-diisocyanate, 4,4'-diphenylpropane diisocyanate, m-phenylene diisocyanate, p-phenylene diisocyanate, naphthylene-1,4-diisocyanate, naphthylene-1,5-diisocyanate, 3,3'-dimethoxydiphenyl-4,4'-diisocyanate, and other aromatic diisocyanates.

The aromatic-aliphatic polyisocyanates include, but are not limited to, xylylene-1,4-diisocyanate, xylylene-1,3-diisocyanate, and other aromatic-aliphatic diisocyanates.

The isocyanate compounds (C) also include dimers, trimers, reaction products or polymers of the aforementioned aliphatic polyisocyanates, alicyclic polyisocyanates, aromatic polyisocyanates and aromatic-aliphatic polyisocyanates. Such compounds include, for example, dimers or trimers of diphenylmethane diisocyanate; reaction products between trimethyloipropane and tolylene diisocyanate; reaction products between trimethylolpropane and hexamethylene diisocyanate; polymethylene polyphenylisocyanates, polyether polyisocyanates, and polyester polyisocyanates.

The pressure sensitive adhesive composition of the present invention may further comprise additional crosslinking agents in addition to the polyisocyanate compounds (C). Such additional crosslinking agents include, for example, polyfunctional melamine compounds and polyfunctional epoxy compounds.

The pressure sensitive adhesive composition of the present invention may be used as intact or may further include additives according to necessity. For example, the composition may comprise known or conventional tackifier resins in order to control adhesion characteristics. Such tackifier resins include, but are not limited to, rosin resins, terpene resins, petroleum resins, coumarone-indene resins, styrenic resins, and phenolic resins. In addition, the composition may comprise conventional additives other than tackifier resin such as plasticizers, finely powdered silica and other fillers, coloring agents, ultraviolet absorbents, antioxidants and other stabilizers. The amounts of these additives may be conventional amounts for use in acrylic pressure sensitive adhesives.

The highly adhesive pressure sensitive adhesive according to the present invention comprises the highly adhesive pressure sensitive adhesive composition mainly comprising the acrylic polymer (A) and further including the amine compound (B) and the isocyanate compound (C). The highly adhesive pressure sensitive adhesive can yield a highly adhesive pressure sensitive adhesive layer (a pressure sensitive adhesive layer) by crosslinking the acrylic polymer (A) by means of heating or another drying procedure.

The highly adhesive pressure sensitive adhesive sheet of the present invention has only to include such a highly adhesive pressure sensitive adhesive layer comprising the highly adhesive pressure sensitive adhesive and may be whichever of a highly adhesive pressure sensitive adhesive sheet with substrate comprising a base material (a substrate) and the highly adhesive pressure sensitive adhesive layer formed at least on one side of the substrate, and a substrateless highly adhesive pressure sensitive adhesive sheet comprising the pressure sensitive adhesive layer alone and including no substrate. To protect the highly adhesive pressure sensitive adhesive layer, a release film (a release liner) may be laminated on the pressure sensitive adhesive layer until the time when the sheet is used. The shape of the highly adhesive pressure sensitive adhesive sheet is not specifically limited and may be any appropriate shape such as a sheet or a tape.

The thickness of the highly adhesive pressure sensitive adhesive layer is not specifically limited and can appropriately be selected within ranges, for example, from about 5 to about 300 μm, and preferably from about 10 to about 100 μm depending on its application.

Base materials (substrates) for use in the highly adhesive pressure sensitive adhesive sheet with substrate include conventional substrates used in pressure sensitive adhesive sheets. Such substrates include, but are not limited to, plastic films made of plastics such as polyethylene and other polyolefin resins, poly(ethylene terephthalate) and other polyester resins, vinyl chloride resins, vinyl acetate resins, polyimide resins, fluorocarbon resins and cellophane; kraft paper, Japanese paper and other paper; single or mixed woven or nonwoven fabrics and other fabrics made of fibrous substances such as Manila hemp, pulp, rayon, acetate fibers, polyester fibers, poly(vinyl alcohol) fibers, polyamide fibers, polyolefin fibers, and other natural fibers, semisynthetic fibers or synthetic fibers; rubber sheets made of rubber such as natural rubber and butyl rubber; foam sheets made of foams such as polyurethane foam and polychloroprene rubber foam; metal foil such as aluminium foil and copper foil; and composites of these materials. As the base material, polyethylene films, polyester films (e.g., poly(ethylene terephthalate) films) and other plastic films are preferred. The base material may be transparent, translucent or opaque. One or both sides of the base material may have been subjected to surface treatment such as corona treatment.

The thickness of the substrate may appropriately be set within ranges not adversely affecting handling property and other properties of the pressure sensitive adhesive sheet and is generally from about 10 to about 500 μm, and preferably from about 20 to about 200 μm.

The highly adhesive pressure sensitive adhesive sheet with substrate can be prepared by applying the highly adhesive pressure sensitive adhesive composition of the present invention at least on one side of the base material, and drying, crosslinking and thereby curing the pressure sensitive adhesive.

The substrate-less highly adhesive pressure sensitive adhesive sheet can be prepared by applying the highly adhesive pressure sensitive adhesive composition of the present invention on a release liner composed of a substrate such as a plastic film (e.g., a poly(ethylene terephthalate) film) having a release layer, and drying, crosslinking and thereby curing the pressure sensitive adhesive. In the release liner, the highly adhesive pressure sensitive adhesive composition is applied onto a side on which the release layer is formed. The release layer can be formed on one or both sides of the substrate in the release liner.

Substrates for use in the release liner are preferably plastic films but also include paper, foams and metal foil. The thickness of the substrate of the release liner can appropriately be set depending on the object and is generally from about 10 to about 500 μm. Materials for such plastic films constituting the substrate of the release liner include, for example, poly(ethylene terephthalate) and other polyesters, polypropylenes, ethylene-propylene copolymers and other polyolefins, poly(vinyl chloride), and other thermoplastic resins. Such plastic films may be whichever of non-stretched films and stretched (uniaxially stretched or biaxially stretched) films.

As the release layer, release layers (e.g., silicone release layers) used as release layers in conventional release liners can be used.

The highly adhesive pressure sensitive adhesive composition can be applied by the use of conventional coaters such as gravure roller coater, reverse-roll coater, kiss contact roller coater, dip-roll coater, bar coater, knife coater and spray coater.

The highly adhesive pressure sensitive adhesive layer may comprise plural layers with or without the interposition of another layer within ranges not deteriorating the advantages of the present invention. For example, the highly adhesive pressure sensitive adhesive sheet may be a double-sided pressure sensitive adhesive sheet comprising a transparent substrate and highly adhesive pressure sensitive adhesive layers of the highly adhesive pressure sensitive adhesive composition of the present invention formed on both sides of the substrate.

The highly adhesive pressure sensitive adhesive sheet of the present invention can be used as a highly adhesive pressure sensitive adhesive tape by cutting the sheet to an appropriate width and winding the cut sheet as a roll.

The highly adhesive pressure sensitive adhesive sheet of the present invention has a 180° peel force with respect to a SUS stainless steel sheet of, for example, equal to or more than about 10 N/20-mm (e.g., from 10 to 25 N/20-mm), preferably equal to or more than about 12 N/20-mm (e.g., from 12 to 23 N/20-mm), and more preferably equal to or more than about 14 N/20-mm (e.g., from 14 to 21 N/20-mm), as determined at a rate of pulling of 300 mm/minute, at 23° C. and at 50% relative humidity.

When the pressure sensitive adhesive sheet is attached to a stainless steel sheet (a SUS stainless steel sheet) and is allowed to stand at 50° C. for 48 hours, it preferably has a 180° peel force with respect to the SUS stainless steel sheet less than or equal to 1.8 times (e.g., from 1 to 1.8 times), more preferably from 1 to 1.6 times, and typically preferably from 1 to 1.5 times the initial adhesion (peel force after adhesion at 23° C. for 20 minutes), as determined at a rate of pulling of 300 mm/minute, at 23° C. and at 50% relative humidity.

The tackiness or adhesion (peel force) can be controlled, for example, by appropriately selecting the types and proportions of monomer components constituting the base polymer of the highly adhesive pressure sensitive adhesive, the type and amount of the polymerization initiator, the temperature and time period of polymerization, and the types and amounts of the crosslinking agent and crosslinking aid.

The highly adhesive pressure sensitive adhesive sheet of the present invention exhibits such high tackiness as to firmly adhere to an adherend upon adhesion operation to the adherend, is suppressed or prevented from increasing in tackiness with time and can be peeled off from the adherend without causing adhesive deposits after adhesion. Accordingly, the pressure sensitive adhesive sheet can widely be applied to various articles in which the pressure sensitive adhesive sheet is peeled off before, during or after use and is useful as a pressure sensitive adhesive sheet for use in articles from which the pressure sensitive adhesive sheet must be peeled off when the articles are recycled.

EXAMPLES

The present invention will be illustrated in further detail with reference to several examples and comparative examples below, which are not intended to limit the scope of the invention. All parts and percentages are by weight unless otherwise specified.

Example 1

To 100 parts of a compound containing n-butyl acrylate, vinyl acetate, acrylic acid and 2-hydroxyethyl acrylate (100: 5:3:0.1 by weight) was added 0.2 part of 2,2'-azobisisobutyronitrile as a polymerization initiator, followed by polymerization in toluene, and thereby yielded a solution (a copolymer solution) containing an acrylic polymer (a copolymer) having a weight average molecular weight of 500000 in terms of polystyrene as determined by gel permeation chromatography (GPC). To 100 parts of solid contents of the copolymer in the copolymer solution were added and sufficiently mixed 25 parts of a rosin resin as a tackifier, 15 parts of a phenolic resin, 1.5 parts of "EDP-1100" (trade name of a product available from Asahi Denka Kogyo K.K.; a polyoxypropylene condensate of ethylenediamine as an amine compound having plural hydroxyl groups) and 2 parts of "Collonate L" (trade name of a polyisocyanate compound available from Nippon Polyurethane Industry Co., Ltd.) and thereby yielded a pressure sensitive adhesive composition. The above-prepared pressure sensitive adhesive composition was applied onto a separator to a dry thickness of 75 μm, was dried at 110° C. for 3 minutes, was transferred to both sides of a nonwoven fabric (basis weight: 14 g/m$^2$) and thereby yielded a double-sided pressure sensitive adhesive tape carrying the nonwoven fabric as a base material.

Example 2

A double-sided pressure sensitive adhesive tape was prepared in the same manner as in Example 1, except that the amount of "EDP-1100" (trade name) as the amine compound containing plural hydroxyl groups was changed to 6 parts.

Comparative Example 1

A double-sided pressure sensitive adhesive tape was prepared in the same manner as in Example 1, except that "EDP-1100" (trade name) as the amine compound containing plural hydroxyl groups was not used. In other words, an amine compound containing plural hydroxyl groups as the crosslinking aid was not used in Comparative Example 1.

Comparative Example 2

To 100 parts of a compound containing n-butyl acrylate and acrylic acid (100:5, by weight) was added 0.2 part of benzoyl peroxide as a polymerization initiator, followed by polymerization in toluene, and thereby yielded a solution (a copolymer solution) containing an acrylic polymer (a copolymer) having a weight average molecular weight of 500000 in terms of polystyrene as determined by GPC. A double-sided pressure sensitive adhesive tape was prepared in the same manner as in Example 1, except that the above-prepared acrylic polymer was used. In other words, the acrylic polymer used in Comparative Example 2 contained no hydroxyl group.

Comparative Example 3

A double-sided pressure sensitive adhesive tape was obtained in the same manner as in Comparative Example 2, except that the "EDP-1100" (trade name) as the amine compound containing plural hydroxyl groups was not used. Specifically, in Comparative Example 2, the acrylic polymer contained no hydroxyl group, and the amine compound containing plural hydroxyl groups as the crosslinking aid was not used.

Determination

The adhesive strength and gel fraction of the double-sided pressure sensitive adhesive tapes obtained in the examples and comparative examples were determined according to the following methods (tackiness measuring method and gel fraction measuring method). The results are shown in Table 1.

Tackiness Measuring Method

A sample pressure sensitive adhesive tape 20 mm wide 100 mm long was brought into contact bonding with the following adherend by the reciprocating motion of a 2-kg roller and was allowed to stand under the following standing condition. Thereafter, the force to remove the tape from the adherend (180° peel force; g/20-mm) was determined as the tackiness according to a 180° peel test at a rate of pulling of 300 mm/minute, at 23° C. and at 50% relative humidity. In Table 1, the symbol "*" on the side of number means that the pressure sensitive adhesive tape left the adhesive (the component of the pressure sensitive adhesive layer) and caused adhesive deposit on the adherend. The symbol "**" means that the pressure sensitive adhesive tape could not be peeled off from the adherend, indicating that the pressure sensitive adhesive layer was so firmly bonded to the adhered as not to be peeled off therefrom.

Adherend: Stainless steel (a SUS stainless steel) sheet, polystyrene sheet and acrylic sheet Standing condition: At 23° C. for 20 minutes, at 23° C. for 48 hours, or at 50° C. for 48 hours Gel Fraction Measuring Method A sample pressure sensitive adhesive having a weight of $W_1$ (about 500 mg) was immersed in ethyl acetate at room temperature for 3 days, was taken out from ethyl acetate, and was dried at 100° C. for 2 hours. The weight $W_2$ of the dried pressure sensitive adhesive was determined, and the gel fraction of the pressure sensitive adhesive was calculated according to the following equation:

$$\text{Gel fraction} = (W_2/W_1) \times 100 (\% \text{ by weight})$$

In Table 1, $M_A$, $M_B$ and $M_C$ are by mole; $M_A$ is the content of hydroxyl groups derived from the acrylic polymer; $M_B$ is the content of hydroxyl groups derived from the amine compound; and $M_C$ is the content of isocyanate groups derived from the polyisocyanate compound.

TABLE 1

|  |  | Example | | Comparative Example | | |
|---|---|---|---|---|---|---|
|  |  | 1 | 2 | 1 | 2 | 3 |
| $M_B/M_A$ | | 7.8 | 31 | 0 | — | — |
| $M_C/[M_B + M_A]$ | | 3.5 | 0.95 | 15.2 | 3.9 | — |
| Gel fraction (wt. %) | | 30 | 33 | 14 | 19 | 1 |
| Tackiness to | 23° C. × 20 min | 14.7 | 15.0 | 15.3 | 15.2 | 17.8 |
| stainless steel | 23° C. × 48 hr | 18.3 | 19.3 | 18.3 | 17.5 | 19.0* |
| sheet (N/20-mm) | 50° C. × 48 hr | 19.0 | 20.7 | 23.0* | 25.7* | ** |
| Tackiness to | 23° C. × 20 min | 15.7 | 15.5 | 14.7 | 15.7 | 18.0 |
| polystyrene | 23° C. × 48 hr | 16.0 | 17.7 | 17.1 | 15.9 | ** |
| sheet (N/20-mm) | 50° C. × 48 hr | 19.3 | 19.3 | 19.6* | ** | ** |
| Tackiness to | 23° C. × 20 min | 12.7 | 13.2 | 12.7 | 13.0 | 13.5 |
| acrylic sheet | 23° C. × 48 hr | 14.7 | 15.7 | 16.0 | 15.6 | 16.0* |
| (N/20-mm) | 50° C. × 48 hr | 16.4 | 17.3 | ** | ** | ** |

Table 1 indicates that the pressure sensitive adhesive tapes according to Examples 1 and 2 each comprise a pressure sensitive adhesive containing the acrylic polymer (A), the amine compound (B) and the isocyanate compound (C) and having a gel fraction of equal to or more than 10% by weight and less than 70% by weight and can therefore exhibit sufficiently high tackiness (adhesion) to the adherends. In addition, the pressure sensitive adhesive tapes can keep their appropriate tackiness over a long time, are suppressed or prevented from increasing in tackiness with time and can be peeled off from the adherends without adhesive deposit after adhesion.

Other embodiments and variations will be obvious to those skilled in the art, and this invention is not to be limited to the specific matters stated above.

What is claimed is:

1. A highly adhesive pressure sensitive adhesive composition comprising at least:
    (A) a hydroxyl-group-containing acrylic polymer as a base polymer, in which the content of the hydroxyl-group-containing copolymerizable monomer is equal to or greater than 0.01 mole % and less than 20 mole % based on the total amount of monomer components;
    (B) an amine compound containing plural hydroxyl groups as a curing aid, said amine compound being represented by formula (1)

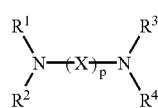

(1)

wherein:
    $R^1$, $R^1$, $R^3$, and $R^4$ are the same or different and each is a hydrogen atom or a group of the formula $-(R^5O)_m(R^6O)_n-H$ in which $R^5$ and $R^6$ are different from one another and each is an alkylene group and each of m and n is an integer of equal to or more than 0, provided that m and n are not concurrently 0 and provided that at least two of $R^1$, $R^1$, $R^3$, and $R^4$ are a group of the formula $-(R^5O)_m(R^6O)_n-H$;
    X is a divalent hydrocarbon group; and
    p is an integer of equal to or more than 1; and
    (C) a polyisocyanate compound as a curing agent,
    wherein a dried or cured product of the composition has a gel fraction of equal to or more than 10% by weight and less than 70% by weight,
    wherein the composition satisfies the following conditions:
        (i) $M_B/M_A$ ranges from 0.05 to 500; and
        (ii) $M_C/[M_A+M_B]$ ranges from 0.05 to 500,
    in which conditions $M_A$, $M_B$ and $M_C$ are molar values, with: $M_A$ being the content of hydroxyl groups derived from the hydroxyl-group-containing acrylic polymer (A); $M_B$ being the content of hydroxyl groups derived from the amine compound (B) containing plural hydroxyl groups; and $M_C$ being the content of isocyanate groups derived from the polyisocyanate compound (C).

2. The composition of claim 1, wherein a dried or cured product of the composition has a gel fraction of from 15% by weight to 50% by weight.

3. The composition of claim 1, in which $M_B/M_A$ is 7,8 and $M_C/[M_A+M_B]$ is 3.5.

4. The composition of claim 1, in which:
    (A) is an acrylic copolymer of n-butyl acrylate, vinyl acetate, acrylic acid, and 2-hydroxyethyl acrylate in a weight ratio of 100:5:3:0.1; and
    (B) is a polyoxypropylene condensate of ethylene diamine.

5. The composition of claim 4, wherein a dried or cured product of said composition has a gel fraction of 30% by weight.

6. A highly adhesive pressure sensitive adhesive sheet comprising: a base material; and a highly adhesive pressure sensitive adhesive layer being formed at least on one side of the base material and comprising the highly adhesive pressure sensitive adhesive composition as claimed in claim 1.

7. The sheet according to claim 6, wherein the sheet has a 180° peel force of equal to or more than 10 N/20-mm with respect to a stainless steel sheet as determined at a rate of pulling of 300 mm/minute, at 23° C. and at 50% relative humidity.

* * * * *